(12) United States Patent
Banginwar et al.

(10) Patent No.: US 7,222,030 B2
(45) Date of Patent: May 22, 2007

(54) METHOD AND APPARATUS FOR PROFILING POWER PERFORMANCE OF SOFTWARE APPLICATIONS

(75) Inventors: Rajesh Banginwar, Hillsboro, OR (US); Eugene Gorbatov, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 2 days.

(21) Appl. No.: 10/773,860

(22) Filed: Feb. 6, 2004

(65) Prior Publication Data

US 2005/0177327 A1    Aug. 11, 2005

(51) Int. Cl.
*G06F 19/00*    (2006.01)
(52) U.S. Cl. ...................................... 702/60
(58) Field of Classification Search ............ 702/60, 702/186, 62, 32; 705/412, 34; 361/18; 700/295, 700/286; 713/340, 320; 329/106; 307/35; 710/65; 324/74
See application file for complete search history.

(56) References Cited

U.S. PATENT DOCUMENTS

| | | | |
|---|---|---|---|
| 5,175,853 A | | 12/1992 | Kardach et al. |
| 5,291,604 A | | 3/1994 | Kardach et al. |
| 5,719,800 A | * | 2/1998 | Mittal et al. ............... 713/321 |
| 6,205,555 B1 | | 3/2001 | Kageshima et al. |
| 6,233,690 B1 | | 5/2001 | Choi et al. |
| 6,357,016 B1 | | 3/2002 | Rodgers et al. |
| 6,711,447 B1 | | 3/2004 | Saeed |
| 6,762,629 B2 | * | 7/2004 | Tam et al. ................. 327/114 |
| 2003/0009705 A1 | * | 1/2003 | Thelander et al. .......... 713/340 |
| 2004/0163003 A1 | * | 8/2004 | Dutton et al. .............. 713/320 |

OTHER PUBLICATIONS

Energy-aware adaptation for mobile applications, Jason Flinn and M. satyanarayanan, School of Computer Science, Carnegie Mellon University, Dec. 1999, pp. 1-16.*
http://www.m-w.com/dictionary/granularity, p. 1.*
http://www.m-w.com/dictionary/granules, p. 1.*
Software Matters for Power Consumption webpage (7 pages), [online] (projected publication date Jan. 22, 2003).
Power Management Technologies for WLAN enabled Handheld Devices, Intel Developer Forum Presentation (2003).
Pering et al., "Dynamic Voltage Scaling and the Design of a Low-Power Microprocessor System," University of California at Berkeley, Electronics Research Laboratory, 6 pages (1998).
Govil et al., "Comparing Algorithms for Dynamic Speed-Setting of a Low-Power CPU," Computer Science Division, University of California, pp. 13-26 (1995).
Grunwald et al., "Policies for Dynamic Clock Scheduling," Department of Computer Science, University of Colorado, 14 pages (2000).
Jason Flinn, M. Satyanarayanan, "PowerScope: A Tool for Profiling the Energy Usage of Mobile Applications," *wmcsa*, p. 2, Second IEEE Workshop on Mobile Computer Systems and Applications, Oct. 12, 2006.

* cited by examiner

*Primary Examiner*—John E. Barlow, Jr.
*Assistant Examiner*—Tung S. Lau
(74) *Attorney, Agent, or Firm*—Marshall, Gerstein & Borun LLP

(57) ABSTRACT

Techniques for profiling systems, such as mobile or embedded devices, are provided. The techniques can profile code executing on these systems based on power used by that code. The system may profile power usage for the entire system or a subsystem, component, or functional unit thereof, for example. The system may determine when a specified amount of power has been used, and a performance sampler may then temporarily stop execution of the code and sample state data. This sampled state data may be provided to a performance analyzer that determines performance of the executing code.

27 Claims, 3 Drawing Sheets

METHOD AND APPARATUS FOR PROFILING POWER PERFORMANCE OF SOFTWARE APPLICATIONS

FIELD OF THE DISCLOSURE

The disclosure generally relates to power management in processor-based systems and, more particularly, to apparatuses and techniques for profiling power performance of code executed on such systems.

BACKGROUND OF THE RELATED ART

Power consumption of software applications is an essential performance characteristic in today's increasingly mobile computing market. Given the very limited advance in battery capacity in recent years, writing applications that are optimized for power is becoming ever more important.

For traditional desktop applications various performance analysis tools are used to identify performance bottlenecks and optimize code that causes performance degradation. These tools, however, lack an efficient and accurate mechanism for measuring and profiling power consumption of applications running on battery powered devices.

Performance analysis tools are an important component in a software development cycle, nevertheless. Such tools allow developers to identify performance bottlenecks in complex software applications and provide a valuable insight into what causes the bottleneck. Performance analysis may be used by developers in optimizing the code identified by the analysis tools as degrading performance.

To obtain data about application performance, the tools typically profile application code and quantify the usage of various system resources. Application code is loaded and executed in an environment that is able to monitor and record various performance characteristics during code execution. Monitoring a complex software application in its entirety is very expensive and impractical, however. Thus, for efficiency purposes, performance analysis tools periodically sample the code executing environment to obtain an 'accurate' measure of performance. This sampling is either time-based or event-based.

In a time-based analysis, the performance tool periodically takes a snapshot of the current state of the system after a predetermined time, or number of clock cycles. In an event-based analysis, a snapshot is taken every time a certain event occurs within the system, such as a cache miss or branch mis-predict. The sampled performance statistics are used to build a profile of the performance of the application running on the monitored system. For example, to identify code that causes an excessive number of data cache misses, a performance analysis tool can use event based sampling (the event being a data cache miss) to profile application code and determine which code modules are using memory inefficiently. These code modules may then be optimized.

Most performance analysis tools target applications written for desktop computers. However, with computing applications becoming increasingly mobile, mobile applications are becoming an important component of the software developing market. While traditional performance characteristics such as instruction count and memory performance are still relevant, with slow progress in increasing battery capacity, power efficiency of mobile applications has become an important performance characteristic too.

To analyze power requirements of mobile applications, performance analysis tools must include mechanisms that enable the profiling of application power consumption. However, simply incorporating power measurement into the existing performance analysis framework will not yield an accurate profile of an applications' power consumption. Neither time- nor event-based sampling is suited for generating profiles of system power usage that provide an accurate and detailed account of power consumption of different code modules.

Both time- and event-based sampling are driven by parameters unrelated to power consumption and thus cannot provide an accurate power profile. For example, time-based sampling will provide inaccurate measurement as different instructions consume different amounts of power, but may still have the same frequency of execution. Sampling applications periodically does not take into account this property of the system as it assumes that each instruction requires an equal amount of power to execute. Similarly, event-based sampling may be based on memory events or instructions executed, but none of the factors measured are indicative of power consumption. Two different code modules may execute the same instructions over the same time or may trigger a snapshot due to the same event (e.g., the same instruction causing a cache miss), but existing time-based and event-based sampling techniques would fail to recognize any differences in the amount of power consumed by the different modules.

DETAILED DESCRIPTION OF A PREFERRED EXAMPLE

Apparatuses and techniques are described to effectively measure and profile power consumption in a system. Unlike state of the art techniques, profiling may be directed by power usage in place of or in addition to time-based and event-based techniques. As such, the techniques may be used to accurately profile power consumption of code, or software modules, from operating systems, firmware, device drivers, or any code executable on a processor-based system. Profile data may be used to identify problematic code, the identification of which may be used during code validation, optimization, or development.

The techniques may be used in desktop, server, network, mobile, or embedded applications, whether wired or wireless. The techniques may be particularly useful for mobile devices, such as laptop computers, personal digital assistants (PDAs), cellular telephones, and smart portable devices, where code power consumption may affect battery performance. Persons of ordinary skill in the art will appreciate that the techniques may be used in other processor environments, as well. Further still, while the described techniques measure performance based on power consumption, the techniques may measure performance based on a combination of metrics, of which power consumption is one. As will be explained in further detail below, any metric indicative of power consumption may be used for profiling code execution. And the metrics may result from power usage in any monitored machine subsystem, component, or embedded unit.

Figure 1:
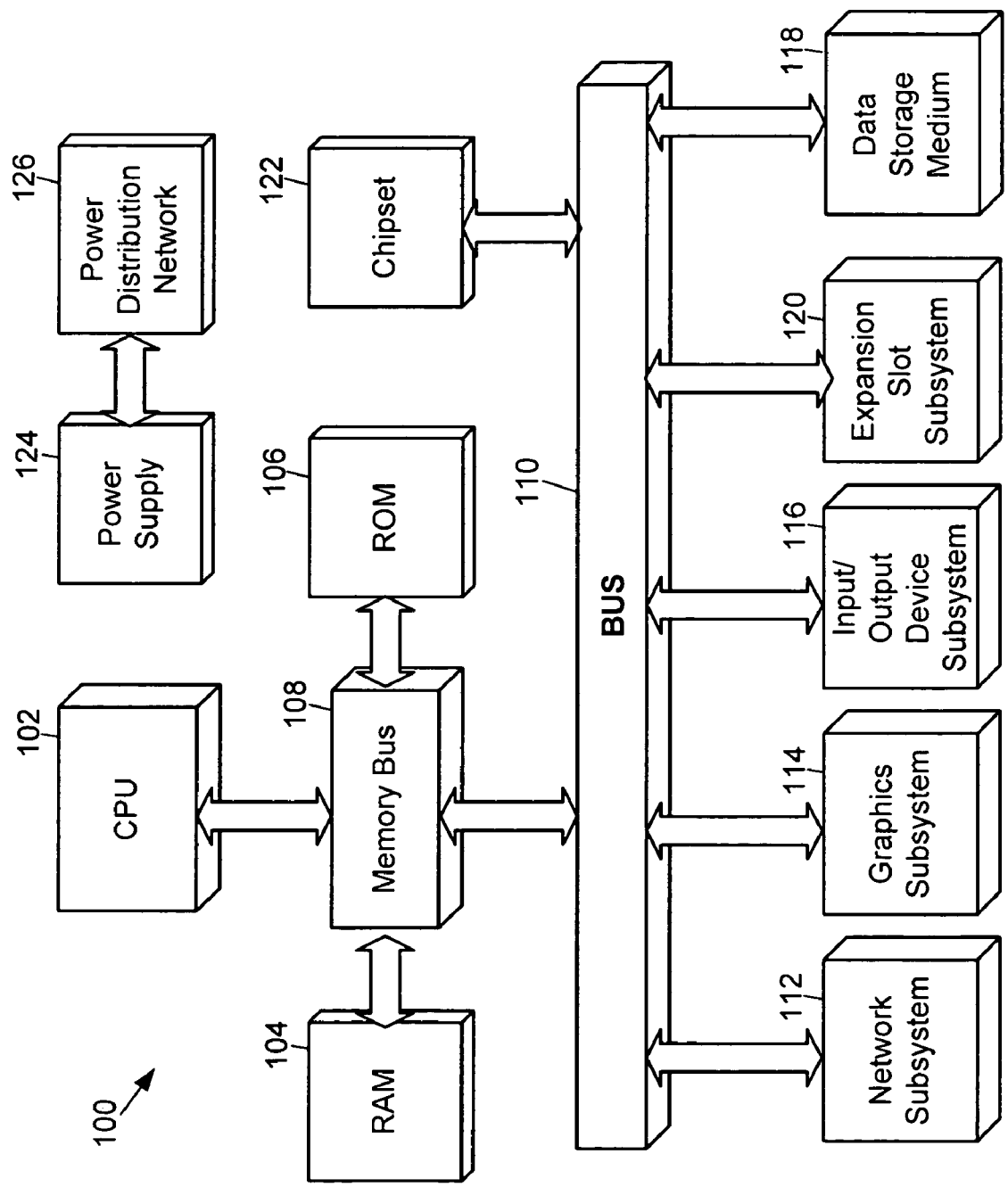
FIG. 1 illustrates a block diagram of an example processor system.

The various techniques may be implemented on processor-based systems such as the example system 100 shown in FIG. 1. The system 100 may be part of a computer system, for example, a personal computer or server application. The system 100 may represent a mobile device such as a laptop computer. Alternatively, the system 100, in whole or in part, may represent a PDA, cellular telephone, or smart device. The system 100 includes a CPU unit 102, which may have Level 1 and Level 2 caches coupled thereto or formed therewith, as would be known to persons of ordinary skill in the art. Sample caches include data cache, instruction cache, and execution cache. The CPU 102 may include a discrete arithmetic logic unit (ALU), registers, and control unit all connected together. Or, as shown, the CPU 102 may be an integrated microprocessor.

The CPU 102 is coupled to a volatile memory, in this example, a random access memory 104, and a read-only memory (ROM) 106, via a memory bus 108. The ROM 106 may represent a memory for storing programmable firmware, in some examples. In the illustrated example, the memory bus 108 is coupled to a system bus 110. Alternatively, the memory bus 108 may be a system bus.

Although not shown, persons of ordinary skill in the art will recognize that the CPU architecture 102 may also include a memory management unit, branch target and write buffers, as well as support logic for debugging and functional units embedded in the CPU architecture 102. An example illustration of the CPU 102 showing detailed CPU functional units is provided in FIG. 3, discussed below. Persons of ordinary skill in the art will appreciate that the illustrated configuration is by way of example only, as the configuration may include additional, fewer, or other components depending on the particular application.

In the illustrated example, the CPU 102 may represent any of a number of microprocessors. Examples include Pentium® 4, Itanium®, Itanium® 2, Xeon™, Mobile Pentium® III-M, Pentium® M, PXA255, PXA262, and/or any XScale™-based processors (all available from Intel Corporation of Santa Clara, Calif.). This list is provided by way of example only. The CPU 102 may represent any of the PowerPC® line of microprocessors available from IBM Corporation of White Plains, N.Y., as well as other single or multiple microprocessor architectures known.

In the illustrated example, the system 100 includes additional subsystems coupled to the CPU 102. By way of example, the system bus 110 is coupled to a series of machine subsystems, a network subsystem 112, such as a network controller, and a graphics subsystem 114, such as an Advanced Graphics Processor (AGP) compatible video card. Also included in the machine subsystems are an input/output device subsystem 116 and a data storage medium 118, e.g., a mass storage device or controller, both connected to the system bus 110. For any of the various desktop, server, networked, mobile, and embedded applications, examples of various devices couplable to the subsystems will be known. Also in the illustrated example, the bus 110 is coupled to another subsystem, an expansion slot subsystem 120. The subsystem 120, i.e., expansion slot device, may represent a Peripheral Component Interconnect (PCI) interface adhering to a Specification Revision 2.1 developed by the PCI Special Interest Group of Portland, Oreg., or a derivative of this specification substantially compliant therewith. The subsystems 116, 118 and 120 may represent any interfaces, however, including an interface for a universal serial bus (USB), Specification 1.0a (USB Implementer's Forum, revision July 2003) or 2.0 (USB Implementer's Forum, originally released April 2000, errata May 2002), an IEEE 1394b standard interface (approved by the Institute of Electrical and Electronics Engineers IEEE in April 2002), or any derivative of these specifications substantially compliant therewith. Other interfaces will be known to persons of ordinary skill in the art.

FIG. 1 also shows a chipset 122 coupled to the bus 110. A power supply 124, which may represent a dedicated power supply or an input power from a supply external to system 100, is coupled to a power distribution network 126 for distributing power through the subsystems and components shown.

The operating system operating within the processor architecture 102 may be one of a variety of systems, for example, one of the WINDOWS family of systems available from Microsoft Corporation of Redmond, Wash., such as WINDOWS 95, 98, 2000, ME, XP, CE, Pocket PC or Mobile. Alternatively, the operating system may be one of the UNIX* family of systems, originally developed by Bell Labs (now Lucent Technologies Inc./Bell Labs Innovations) of Murray Hill, N.J. and available from various sources. As a further alternative, the operating system may be an open-source system, such as the LINUX* operating system. It will be recognized that still further alternative operating systems may be used.

Figure 2:
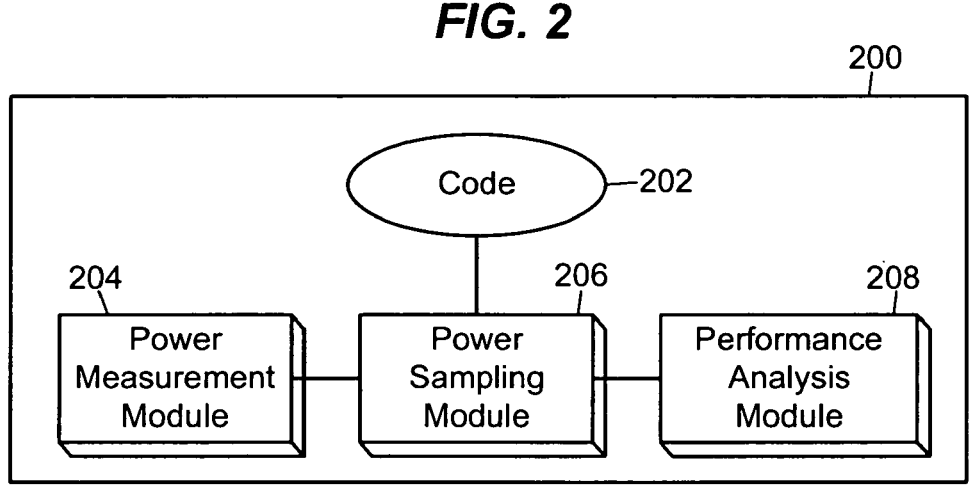
FIG. 2 illustrates a power performance profiling architecture that may execute on the processor system of FIG. 1.

To accurately profile power consumption of an executing code, architecture 200, such as that shown in FIG. 2, may be implemented on the system 100. The architecture 200 presents a performance analysis framework that executes code or code module(s) associated with an application or multiple applications, represented by code 202. The code 202 may represent an operating system, an application executing on top of that operating system, firmware, device drivers, or other code. The code 202 may be executed by the various subsystems of system 100, or solely within the CPU 102. The code 202 may be executed in a first virtual machine abstraction presented by the system 100 to allow for additional, parallel code to execute simultaneously in another virtual machine abstraction, in an example. Alternatively still, the code 202 may be executed remotely, such as in a networked or server environment or mobile or embedded wireless embodiment.

The architecture 200 includes a power measurement module (PMM) 204 that may measure power usage of the system 100 or any combination of the subsystems 112–120, for example. The term power usage, as used herein, may include either the power delivered to or the power consumed by an element. The PMM 204 represents any of the known techniques for measuring power within a process-based system. The PMM 204, for example, may be part of the system 100 and coupled to the CPU 102 and subsystems 112–120. The PMM 204 may measure current or power as delivered from the power supply 124, power distribution network 126, or other source to the system 100 or any subsystem, component, or functional unit thereof, for example. Thus with the example of FIG. 1 (and FIG. 3), the PMM 204 may measure power usage of any subsystem, component, or functional unit shown. The PMM 204 may measure power usage by one or any combination of the elements shown, as desired.

The PMM 204 monitors power consumption for an adjustable granularity of power usage, of which microamps, milliamps, amps (for current), microwatts, milliwatts, and watts (for power) are example granularities. This granularity may be adjusted by a power sampling module (PSM) 206 coupled to the PMM 204.

Once the PMM 204 measures a desired quantum of power consumption by or power delivered to the system or subsystem, the PMM 204 sends an indication to the PSM 206. Alternatively, the PSM 206 may periodically poll the PMM 204 to determine if the desired quantum of power usage has occurred.

To develop a profile of the system or subsystem after a given quantum of power usage, i.e., after a predetermined number of power granularities have occurred (e.g., after 10 mA or 10 m watts of power usage), the PSM 206 executes in the CPU 102 and is coupled to the PMM 204. Upon trigger from the PMM 204, the PSM 206 stops code execution on the system 100 and takes a snapshot of the system 100 or the desired subsystem(s). The PSM 206 may, for example, record the state of the system, a program counter, stack pointer, current memory usage, number of instructions executed since the last snapshot, or how many hard disk or memory accesses have occurred since the last snapshot. Thus, the PSM 206 may record the state of the system or the state of a subsystem, functional unit, or component. The data is collectively referred to as state data herein. The performance analysis architecture 200 may use this state data in profiling overall power consumption of the particular code 202. Persons of ordinary skill in the art will know that other system characteristics may be recorded as well during a snapshot, as state data.

A performance analysis module (PAM) 208 is coupled to the PSM 206 and uses the data collected by the PSM 206 to analyze performance of the system 100 in executing the code 202. The PAM 208 may implement various analysis features depending on the intended use of the performance analysis tool. For example, the PAM 208 may determine a power profile of an application or code that shows a breakdown of the power consumption by different modules within that code. The PAM 208 may profile code down to the individual instructions or functions executed. The PAM 208 may determine the number of times a particular code is executing during a state data sampling of the PSM 206. If a particular code is more frequently executed over a series of samples form the PSM 206, as compared to other code, this may be an indication that this code is more time consuming or problematic than other code. Similarly, if after repeated contiguous samples, the PAM 208 determines that the same code is executing, then the system may be hung up executing the particular code and the PAM 208 may indicate as much to a user. The PAM 208 may be programmed to store and compare historical sampled data to allow profiling of code executing within the system 100 generally or within any subsystem, component, functional unit, or combination of these. For example, the PAM 208 may profile code executing in the chipset 122 or graphics subsystem 114, and not merely code executing on the CPU 102. In any event, as a result, a power consumption-based rendition of executed code may be developed.

The PAM 208 may be implemented in numerous ways. Merely by way of example, the PAM 208 may be a modified version of the VTune™ Performance Analyzer, available from Intel Corporation of Santa Clara. VTune software is able to evaluate performance of code that is simultaneously running on a computer system. VTune is integrable with .NET environments, such as those originally developed by Microsoft Corporation of Redmond, Wash. VTune also supports LINUX* and UNIX* operating environments and may be used in enhanced multithreaded applications and hyper-threaded processor analysis. The PAM 208 may be any suitable performance analysis tool, as the snapshot data from the PSM 206 may be transparent as to the event precipitating the snapshot. In other examples, the snapshot data to the PAM 208 may include power consumption data from the PMM 204.

Figure 3:
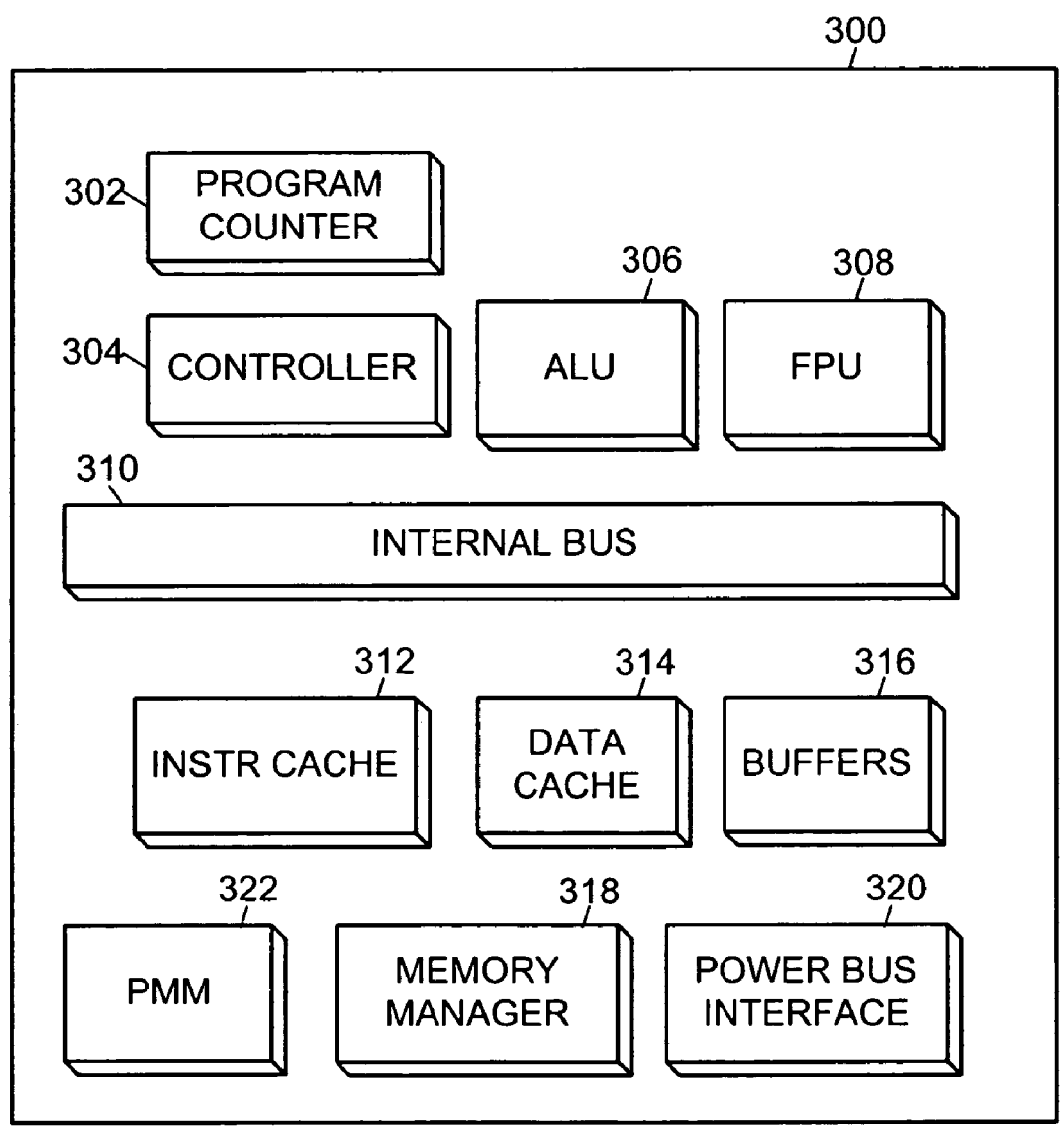
FIG. 3 illustrates a detailed example of the CPU of FIG. 1, showing CPU functional units that may be individually monitored for power usage.

As described above, power usage may be monitored for subsystems, such as the subsystems 112–120 of FIG. 1. Other subsystems may be monitored as well, such as the CPU 102, the RAM 104, the ROM 106, and the chipset 122. These devices, and others not shown, are commonly referred to as subsystems. Components such as the buses 108 and 110, the power supply 124 and the power distribution network 126 may also be measured. Components include those parts of a system that receive power but are not commonly considered individual subsystems. Also, the embedded units that collectively form a subsystem may be measured. For example, FIG. 3 shows an example CPU 300, which includes a plurality of functional units and which may be used as the CPU 102.

The CPU 300 includes a program counter 302, controller 304, arithmetic logic unit (ALU) 306, and a floating point processor 308. These all may be coupled to an internal bus 310. In the illustrated example, the CPU 300 also includes an instruction cache 312, a data cache 314, and cache and other buffers, collectively referenced as buffers 316. A memory manager 318 is also shown and may couple the CPU 300 to a memory bus or system bus. A power bus interface 320 is also shown for coupling power into the CPU 300. To monitor power usage in these functional units of the CPU 300, a PMM 322 is also shown. The PMM 322 may be coupled to the power bus interface 320 and/or any of the functional units illustrated to measure power delivered or consumed. The PMM 322 may measure such power usage for an individual functional unit or for any combination of functional units. Persons of ordinary skill in the art will recognize that the illustrated functional units are by way of example, as fewer, additional, or other functional units may be included in the CPU 300. Furthermore, while the illustrated example is of the functional units embedded in a CPU, embedded units of non-CPU subsystems may also be monitored for power usage.

EXAMPLE 1

Figure 4:
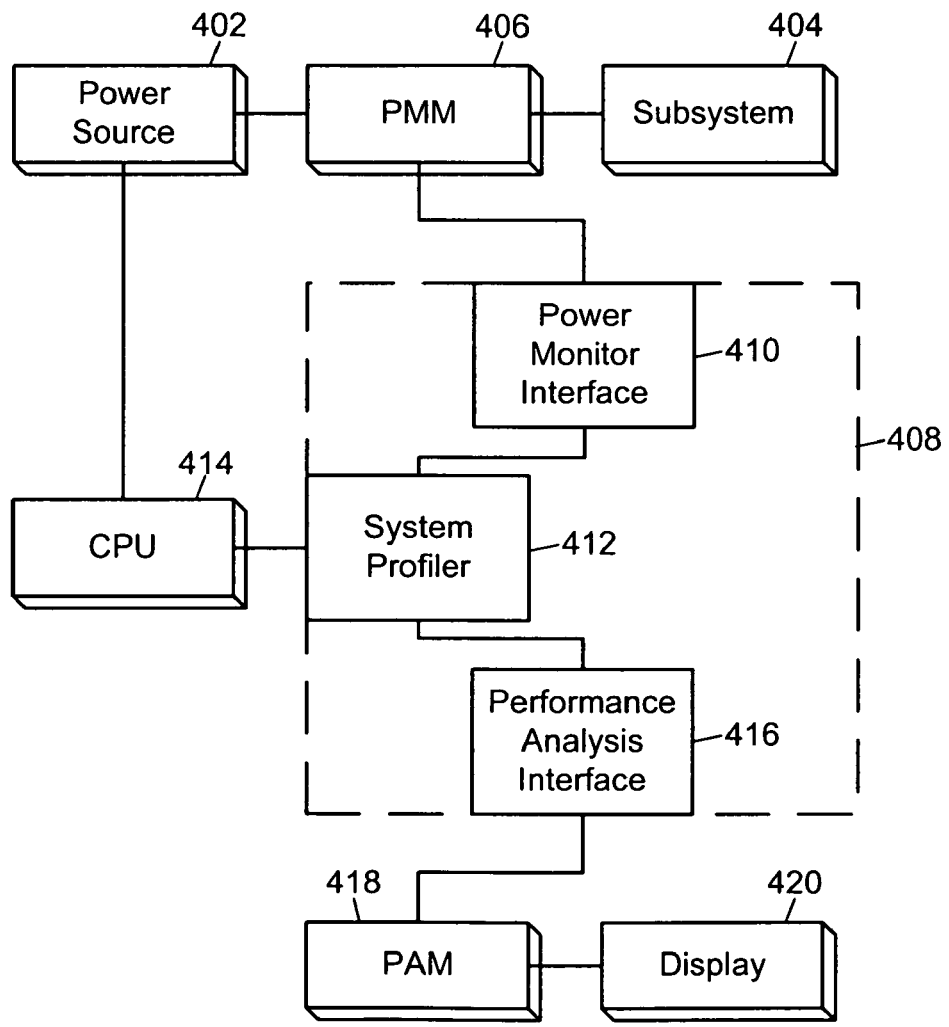
FIG. 4 illustrates one example of the architecture of FIG. 2.

FIG. 4 illustrates an example implementation of architecture 400, similar to the architecture 200. A DC power source 402, such as a battery in a mobile or embedded device, supplies power to a subsystem 404 of the architecture 400. The subsystem 404 represents any machine subsystem, but in this example, it could also represent any component of a system or functional unit of the CPU. To measure the amount of power transmitted, a PMM 406 is coupled between the power source 402 and the subsystem 404. Alternatively, the PMM 406 may be coupled either to the power source 402 or to the subsystem 404. The PMM 406 is also coupled to a PSM 408 via a power monitoring interface 410, which may communicate with the PMM 406 to receive an indication that a desired quantum of power delivery from the power source 402 to the subsystem 404 has occurred. The PSM 408 further includes a system profiler 412 coupled to a CPU 414 for taking a snapshot of the CPU 414 upon a signal from the PMM 406. Alternatively, the system profiler 412 may be coupled to any system, subsystem (e.g., the subsystem 404), or combination of these within the architecture 400. The system profiler 412 is also coupled to a performance analysis interface 416 within the PSM 408. The interface 416 may provide the snapshot of the CPU 414 to a PAM 418, which may perform profile analysis on the data. The PAM 418 may display this analysis data to a user via a display 420, generally shown.

Although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalence.

What we claim is:

1. An article comprising a machine-accessible medium having stored thereon instructions that, when executed by a machine, cause the machine to:
   measure power usage on the machine;
   determine when a quantum of power has been used on the machine;
   in response to usage of the quantum of power on the machine, trigger sampling of state data of the machine, where the state data indicates a state of code executing on the machine;
   analyze performance of the code executing on the machine based on sampled state data;
   develop a machine storable profile of power usage of the code executing on the machine; and
   adjust granularity of the quantum of power.

2. The article of claim 1, having further instructions that, when executed by the machine, cause the machine to:
   provide the sampled state data to a performance analysis module; and
   compare the sampled state data to previously sampled state date for determining the profile of power usage of the code based on the state data.

3. The article of claim 1, wherein the machine has a power measurement module.

4. The article of claim 3, wherein the machine comprises a plurality of subsystems and wherein the power measurement module is coupled to at least one of the plurality of subsystems for measuring power usage of the at least one of the plurality of subsystems.

5. The article of claim 4, having further instructions that when executed on the machine, cause the machine to:
   measure power usage of at least one of the plurality of subsystems.

6. The article of claim 5, wherein the at least one of the plurality of subsystems includes a network subsystem, a graphics display subsystem, or a data storage subsystem.

7. The article of claim 5, wherein the at least one of the plurality of subsystems includes an input/output device or an expansion slot subsystem.

8. The article of claim 1, wherein the state data is a program counter indicative of a state of execution of the code.

9. The article of claim 1, wherein the state data comprises a program counter, status of the machine, status of at least one subsystem of the machine, status of at least one component of the machine, or status of at least one functional unit embedded in a subsystem.

10. The article of claim 1, having further instructions that when executed on the machine, cause the machine to profile the code executing on the machine by profiling the power usage of instructions or functions executed by the code.

11. The article of claim 1, wherein the machine comprises a plurality of subsystems, the article having further instructions that when executed on the machine, cause the machine to determine the power usage of the code executing within one of the plurality of subsystems.

12. The article of claim 1, wherein the state data comprises a stack pointer, current memory usage, a number of instructions executed, or a number of accesses to a memory storage.

13. The article of claim 1, wherein the machine has a power measurement module, a central processing unit, and a plurality of functional units embedded within the central processing unit, wherein the power measurement module is coupled to the central processing unit for measuring power usage of at least one of the plurality of functional units enabled within the central processing unit.

14. A method of profiling code executable on a machine, the method comprising:
   measuring power usage on the machine;
   determining when a quantum of power has been used on the machine;
   in response to usage of the quantum of power on the machine, sampling state data on the machine, where the state data indicates a state of code executing on the machine, wherein a granularity of the quantum of power is adjustable;
   analyzing performance of the code executing on the machine based on the sampled state data; and
   developing a machine storable profile of power usage of the code executing on the machine.

15. The method of claim 14, wherein the machine comprises a plurality of subsystems, and wherein measuring power usage comprises measuring power delivered to at least one of the plurality of subsystems.

16. The method of claim 14, wherein the machine comprises a plurality of subsystems, measuring power usage comprising measuring power consumed by at least one of the plurality of subsystems.

17. The method of claim 14, wherein the machine comprises a plurality of subsystems and a power measurement module capable of measuring current or power delivered to at least one of the plurality of subsystems.

18. The method of claim 17, wherein the at least one of the plurality of subsystems includes a network subsystem, a graphics display subsystem, or a data storage subsystem.

19. The method of claim 17, wherein the at least one of the plurality of subsystems includes an input device or an expansion slot device.

20. The method of claim 14, further comprising:
   providing power to the machine.

21. The method of claim 14, wherein determining the profile of power usage of the code executing on the machine comprises:
   comparing the state data sampled over a plurality of quantums of power usage and profiling instructions or functions executed by the code during the usage the plurality of quantums of power usage.

22. The method of claim 14, wherein the state data is a program counter.

23. The method of claim 14, wherein the state data comprises a program counter, status of the machine, status of at least one subsystem of the machine, status of at least one component of the machine, or status of at least one functional unit embedded in a subsystem.

24. An apparatus comprising:
   a power measurement module capable of measuring power usage in the apparatus and capable of determining when a quantum of power has been used over a period of time; and a power sampling module coupled to the power measurement module for sampling state data of the apparatus, where sampling is triggered by an indication from the power measurement module when each of a plurality of the quantums of power has been used, wherein the power sampling module is capable of adjusting granularity of the quantum of power; and a power analysis module that analyzes code executing on the apparatus in response to the sampling of the state data to develop a power profile of the code.

25. The apparatus of claim 24, further comprising a power source.

26. The apparatus of claim 24, wherein the power analysis module compares the sampled state data to stored state data.

27. The apparatus of claim 24, wherein the state data comprises a program counter, status of the machine, status of at least one subsystem of the machine, status of at least one component of the machine, or status of at least one functional unit embedded in a subsystem.

* * * * *

UNITED STATES PATENT AND TRADEMARK OFFICE
CERTIFICATE OF CORRECTION

PATENT NO.         : 7,222,030 B2
APPLICATION NO.    : 10/773860
DATED              : May 22, 2007
INVENTOR(S)        : Rajesh Banginwar et al.

It is certified that error appears in the above-identified patent and that said Letters Patent is hereby corrected as shown below:

In the Claims:

At Column 7, line 33, claim 2 "date" should be -- data --.

Signed and Sealed this

Twentieth Day of November, 2007

JON W. DUDAS
*Director of the United States Patent and Trademark Office*